UNITED STATES PATENT OFFICE 2,351,924

DISINFECTING PRODUCT AND PROCESS FOR ITS MANUFACTURE AND APPLICATION

Boruk Carnauh, Paris, France; vested in the Alien Property Custodian

No Drawing. Application March 4, 1940, Serial No. 322,257. In France March 27, 1939

7 Claims. (Cl. 252—187)

For decontaminating surfaces contaminated with yperite, it has been proposed to neutralize this liquid by means of chlorinated pastes, in particular of calcium chloride or, preferably, of calcium hypochlorite powder mixed with water. It has been found, however, that an aqueous chlorinated solution does not satisfactorily penetrate the affected area.

This has been more or less remedied by adding emulsifying or wetting agents to the chlorinated solution. However, these improved chlorinated solutions surround the yperite without dissolving it and they are especially unsatisfactory when the surface on which the yperite is deposited is fatty, or porous, as are a large number of surfaces, in particular wood, cement, leather, human or animal skin, the ground, plaster, certain paints.

The present invention has for its object a novel decontaminating product which is suitable, even in the case of the above mentioned porous substances, for neutralizing yperite and like products.

Said product is characterized by the fact that the excipient in which the chlorinated powder is placed in suspension is a substance which has a great power of penetration into said porous substances, is very miscible with yperite or like products, and with fatty substances, has little or no reaction with the chlorinated powders, and to which there is added, preferably at the instant when it is to be used, a few per cent of water, or better of an agent (which will be called accelerator) containing a little water and a solvent which is miscible with water.

The result obtained appears to be due to the following cause: yperite behaves physically like a fatty substance and penetrates deeply into the pores. In order to reach it therein and to mix with it, it therefore requires a substance which is also very penetrating and very miscible therewith.

Certain excipients, whereof the satisfactory result has already been checked, are indicated hereinafter by way of examples.

When the calcium hypochlorite powder is placed in intimate contact with a solvent, the latter becomes charged, under certain conditions which will be explained hereinafter, with chlorine and perhaps with hypochlorous acid which it can thus supply to all the parts affected by yperite with which it mixes. The solvents which appear to give the best results as excipients are chlorinated solvents, for example orthodichlorobenzene, tetrachlorethane, trichlorethylene, or again petroleum, gas-oil, benzole etc.

It is also possible to use as excipients oleaginous or fatty substances such as paraffin oil, cod-liver oil, Vaseline, lanolin etc. The products mainly comprising these fatty substances and petroleum, gas-oil etc. are particularly recommended for the skin, since they have no irritating action, adhere well and thus prevent burns from the chlorinated powders, which burns may occur when said chlorinated powders are used in aqueous solution.

It is also possible to use as an excipient a mixture of solvents and of fatty substances, for example a mixture of: petroleum, Vaseline, lanolin, cod-liver oil.

In the case in which the surface impregnated wit hyperite is damp, there will be added, either as a mixture, or by spraying the contaminated surface, before or after it is treated with the decontaminating product, a solvent which is miscible with water so that the latter shall not prevent said solvent from penetrating into the pores. Said solvents may for example be alcohols, in particular ethyl alcohol, or again ethyl acetate, methyl acetate etc.

The solvents of the orthodichlorobenzene, petroleum, or benzole type, and also the fatty substances mentioned, are advantageous as regards storing, since they are not hygroscopic; with those excipients of this type which are liquid, the chlorinated powder incorporated therein deposits after a time under a layer of liquid which protects it from damp; with the fatty substances the mixture persists and the protection of the chlorinated powder from damp is also obtained.

Some solvents, in particular those which are miscible with water, produce a reaction and evolve chlorine when the chlorinated powder is incorporated. This reaction is strong or weak according to the solvent. In the case in which some of such solvents could be used, it is desirable to make the paste only at the instant when it is to be used, in order to take advantage of this abundant initial production of chlorine.

Some other solvents, in particular orthodichlorobenzene, petroleum, gas-oil, benzole, tetrachlorethane, trichlorethylene, etc. become charged with only a very small quantity of chlorine or even not at all. However, they produce a more abundant quantity of free chlorine if a little water is added, in sufficient quantity with respect to the chlorinated powder, or better still a mixture of water miscible solvent and water, for example a mixture containing 10 of water, 50 of alcohol, 50 of ethyl acetate. It is desirable to add this water or this accelerator only at the instant when the product is to be used, and for example in a proportion of 1 to 10%.

The inventor has found that the free chlorine which is transferred from the chlorinated powders to the solvent gradually evaporates from the latter, thereby causing a fresh supply to come from the powders. Consequently, in order that the solvent shall always be well supplied with chlorine and always ready to neutralize the yperite into which it penetrates, it is desirable for the mixture between the powder and the excipient within the paste to be as intimate as possible.

In order to produce and maintain this intimate contact, it is advantageous to grind the chlorinated powder in the liquid of fatty excipient and furthermore, in certain cases and with certain liquid excipients, to mix with the paste a small quantity of a pigment which is capable of remaining a very long time in suspension and acts as a suspension support for the chlorinated powder, for example lamp-black, fine asbestos powder, colloidal silica.

By way of concrete examples, the following are some paste formulae which have given good results:

*Product No. 1*

|  | Grams |
|---|---|
| Orthodichlorobenzene | 300 |
| Calcium hypochlorite | 100 |
| Accelerator | 20 |

The accelerator is preferably only added at the instant when the paste is to be used.

*Product No. 2*

This product only differs from Product No. 1 by the addition of 2 gm. of lamp-black.

This product is particularly stable; it is suitable in case of prolonged storing.

*Product No. 3*

|  | Grams |
|---|---|
| Petroleum | 100 |
| Vaseline | 50 |
| Calcium hypochlorite | 40 |
| Accelerator | 0.5 |

This product is prepared by grinding; it is intended for the de-contamination of human or animal skin; as it always has to be ready for instant use, it is stored after mixing with the accelerator.

The mechanism of the action of a de-contaminating product according to the invention on a fatty or porous surface substance contaminated with yperite appears to be as follows:

At each point it touches on a fatty or porous surface, yperite forms a spot which spreads at the surface and penetrates deep into the pores. Since the excipient is a solvent for fats or is at any rate miscible with them and has a great power of penetration, it has a marked tendency to mix with the fats and to penetrate deeply into the pores where the yperite itself has already also penetrated very deeply; as said excipient is very miscible with yperite, it can penetrate by mixing therewith into the entire depth occupied by the latter; the chlorinated powder remains at the surface of the substance and owing to its intimate mixture by grinding in the excipient and to its being held in suspension, it forms a continuous layer on said surface. The chlorine dissolved in the excipient which has intimately mixed with the yperite acts to neutralize the latter; the yperite, which owing to its diffusion in the excipient comes up from the bottom of the pores to the surface, encounters the continuous layer of chlorinated powder and is thus completely neutralized; this diffusion of the yperite in the excipient tends to spread the yperite content uniformly at all the points of the surface which are covered by the excipient, whereby the attacking power is greatly decreased at the places where there were concentrated masses of yperite.

In the case in which the porous substance contains traces of moisture, it would appear that the solvents which are not miscible with water, such as orthodichlorobenzene, while losing none or very little of their power of penetration into the pores, are incapable of carrying the chlorine beyond a certain depth. This does not prevent them from acting usefully, since owing to the above mentioned phenomenon of reciprocal diffusion and penetration of the excipient and the yperite, the yperite partially rises from the depths of the pores in the excipient, encounters the upper part of the latter which contains the most chlorine, then the continuous layer of chlorinated powder deposited at the surface; it is thus neutralized; the yperite concentration and consequently the attacking power decrease; as the phenomenon continues, all the yperite becomes neutralized after some time.

These products for neutralizing yperite may of course be used for neutralizing any similar substance, lewisite for example, which is converted by chlorine into a harmless substance.

These products may also be used in agriculture or for disinfecting floors, for destroying insects.

What I claim is:

1. A product for decontaminating by yperite, lewisite and other war gases that can be destroyed by chlorine, particularly on fatty surfaces and on porous surfaces such as wood, cement, plaster, certain paints, the ground, leather, living skin, comprising a mixture of calcium hypochlorite and an excipient having a great power of penetration into said fatty and porous substances, which is very miscible with yperite and like products and has only a slight reaction with said chlorinated powder, said excipient being a chlorinated compound of the group consisting of orthodichlorobenzene, trichlorethylene, tetrachlorethane.

2. A product for decontaminating yperite, lewisite and other war gases that can be destroyed by chlorine, particularly on fatty surfaces and on porous surfaces such as wood, cement, plaster, certain paints, the ground, leather, living skin, comprising 300 parts of orthodichlorobenzene, 100 parts of ground calcium hypochlorite and 20 parts of water-miscible solvent and water.

3. A product for decontaminating yperite, lewisite and other war gases that can be destroyed by chlorine, particularly on fatty surfaces and on porous surfaces such as wood, cement, plaster, certain paints, the ground, leather, living skin, when said surfaces are moist, comprising a mixture of calcium hypochlorite and an excipient of the group of products having a great power of penetration into said fatty and porous substances, which is very miscible with yperite and like products and has only a slight reaction with said hypochlorite, and a water-miscible solvent of the group consisting of ethyl alcohol, ethyl acetate and methyl acetate.

4. A process for decontaminating yperite, lewisite and other war gases that can be destroyed by chlorine, particularly on fatty surfaces and on porous surfaces such as wood, cement, plaster, certain paints, the ground leather, living skin, when said surfaces are moist, which comprises applying to a contaminated surface a powder of calcium hypochlorite and an excipient having a great power of penetration into said fatty and porous substances, which is very miscible with yperite and like products and which has only a slight reaction with said chlorinated powder, and spraying the surface to be treated with a water-miscible solvent.

5. A process for decontaminating by yperite, lewisite and other war gases that can be destroyed by chlorine, particularly on fatty surfaces and on porous surfaces such as wood, cement, plaster, certain paints, the ground, leather, living skin, when said surfaces are moist, which comprises applying to a contaminated surface a powder of calcium hypochlorite, and an excipient having a great power of penetration into said fatty and porous substances, which is very miscible with yperite and like products and which has only a slight reaction with said chlorinated powder, said process comprising, in addition, the step of spraying the surface to be treated with a water-miscible solvent of the group consisting of ethyl alcohol, ethyl acetate and methyl acetate.

6. A decontaminant for vesicant gases such as yperite which comprises finely divided calcium hypochlorite dispersed in a chlorinated vehicle selected from a group consisting of orthodichlorobenzene, trichlorethylene and tetrachlorethane.

7. A decontaminant for vesicant gases such as yperite which comprises finely divided calcium hypochlorite intimately mixed with orthodichlorobenzene, water and ethyl alcohol.

BORUK CARNAUH.